United States Patent
Groves, Jr.

(10) Patent No.: US 8,953,600 B2
(45) Date of Patent: Feb. 10, 2015

(54) TELEMETRY DATA ROUTING

(75) Inventor: Vernon Richard Groves, Jr., Duvall, WA (US)

(73) Assignee: Microsoft Corporation, Redmond, WA (US)

(*) Notice: Subject to any disclaimer, the term of this patent is extended or adjusted under 35 U.S.C. 154(b) by 162 days.

(21) Appl. No.: 13/615,985

(22) Filed: Sep. 14, 2012

(65) Prior Publication Data

US 2014/0079057 A1   Mar. 20, 2014

(51) Int. Cl.
*H04L 12/28* (2006.01)

(52) U.S. Cl.
USPC .......................... 370/390; 370/392

(58) Field of Classification Search
None
See application file for complete search history.

(56) References Cited

U.S. PATENT DOCUMENTS

| | | | |
|---|---|---|---|
| 7,970,890 B1* | 6/2011 | Krivopaltsev et al. | 709/224 |
| 2003/0151977 A1 | 8/2003 | Shah et al. | |
| 2004/0131115 A1* | 7/2004 | Burgess et al. | 375/240.01 |
| 2006/0206698 A1 | 9/2006 | Foucher et al. | |
| 2006/0209737 A1* | 9/2006 | Barnhart et al. | 370/316 |
| 2007/0025258 A1* | 2/2007 | Chen | 370/241 |
| 2007/0117635 A1* | 5/2007 | Spanton et al. | 463/43 |
| 2008/0037417 A1* | 2/2008 | Kim et al. | 370/217 |
| 2010/0135163 A1* | 6/2010 | Chen | 370/242 |
| 2013/0021936 A1* | 1/2013 | Chen | 370/252 |
| 2013/0329578 A1 | 12/2013 | Groves et al. | |

FOREIGN PATENT DOCUMENTS

CA   2617328 A1   8/2003

OTHER PUBLICATIONS

Naous, et al., "Implementing an OpenFlow Switch on the NetFPGA platform", Retrieved at <<http://yuba.stanford.edu/~jnaous/papers/ancs-openflow-08.pdf>>, Proceedings of the 4th ACM/IEEE Symposium on Architectures for Networking and Communications Systems (ANCS '08), Nov. 6, 2008, pp. 9.
"Brocade Telemetry Solutions", Retrieved at <<http://www.brocade.com/downloads/documents/white_papers/NetworkTelemetry-GA-WP-1552.pdf>>, Retrieved Date: Mar. 2, 2012, pp. 12.
El-Ghazawi, et al., "Pacet: PC-Parallel Architecture for Cost-Efficient Telemetry Processing", Retrieved at <<http://ieeexplore.ieee.org/stamp/stamp.jsp?tp=&arnumber=682205>>, IEEE Aerospace Conference, 1998, Mar. 21, 1998, pp. 347-354.
"Software for Parallel Processing of Telemetry", Retrieved at <<http://www.techbriefs.com/component/content/article/3233>>, May 1, 2002, pp. 2.

(Continued)

*Primary Examiner* — Suk Jin Kang
(74) *Attorney, Agent, or Firm* — Jim Sfekas; Kate Drakos; Micky Minhas (57) ABSTRACT

Among other things, one or more techniques and/or systems are provided for routing telemetry data to one or more receivers. That is, telemetry data, such as activity data associated with a network device (e.g., a switch, a router, etc.), may be routed to one or more receivers in-flight (e.g., while the telemetry data is being processed by a network device, as opposed to being stored within a storage device for processing). In one example, telemetry data may be forked into a first telemetry data stream for a first receiver, a second telemetry data stream for a second receiver, and/or other telemetry data streams. Respective telemetry data streams may be formatted according to a receiver destination policy. In this way, one or more telemetry data streams, forked from the telemetry data in-flight, may be delivered to one or more receivers in-flight.

20 Claims, 7 Drawing Sheets

(56) References Cited

OTHER PUBLICATIONS

Wang, et al., "OpenFlow-Based Server Load Balancing Gone Wild", Retrieved at <<http://www.cs.princeton.edu/~jrex/papers/loadwild10.pdf>>, Hot-ICE '11, Mar. 29, 2011, pp. 6.

"User Datagram Protocol", Retrieved on Aug. 21, 2012, pp. 1-8, http://en.wikipedia.org/wiki/User_Datagram_Protocol.

Int. Search Report cited in PCT Application No. PCT/US2013/058353 dated Nov. 21, 2013, 8 pgs.

\* cited by examiner

FIG. 7

TELEMETRY DATA ROUTING

BACKGROUND

Telemetry data collected from network devices, such as routers and switches, may be used to improve network efficiency by providing insight into activities performed by the network devices. In general, telemetry data is pushed from a network device to a recipient by utilizing CPU cycles and resource bandwidth of the network device. Unfortunately, pushing telemetry data from the network device may negatively impact the performance of the network device due to relatively low CPU power and memory available for the network device. In this way, pushing telemetry data to multiple recipients may reduce operating efficiency of a resource constrained network device.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for routing telemetry data to one or more receivers is provided herein. A network device, such as a router or switch, may generate telemetry data corresponding to activities of the network device. Multiple receivers, such as end-users or servers, may desire to obtain the telemetry data (e.g., an IT department may desire the telemetry data for internal IT billing for network usage; a network optimization department may desire the telemetry data for internal analysis for future upgrades; etc.). Accordingly, telemetry data, received from the network device, may be distributed in-flight to one or more receivers (e.g., rather than being pushed from the network device). That is, in order to mitigate security risks, processing overhead, and/or latency associated with storing telemetry data within a storage device for processing and distribution to multiple receivers, the telemetry data may be formatted and delivered in-flight to multiple receivers without storing the telemetry data to a storage device, such as a disk drive of a server.

Figure 4:
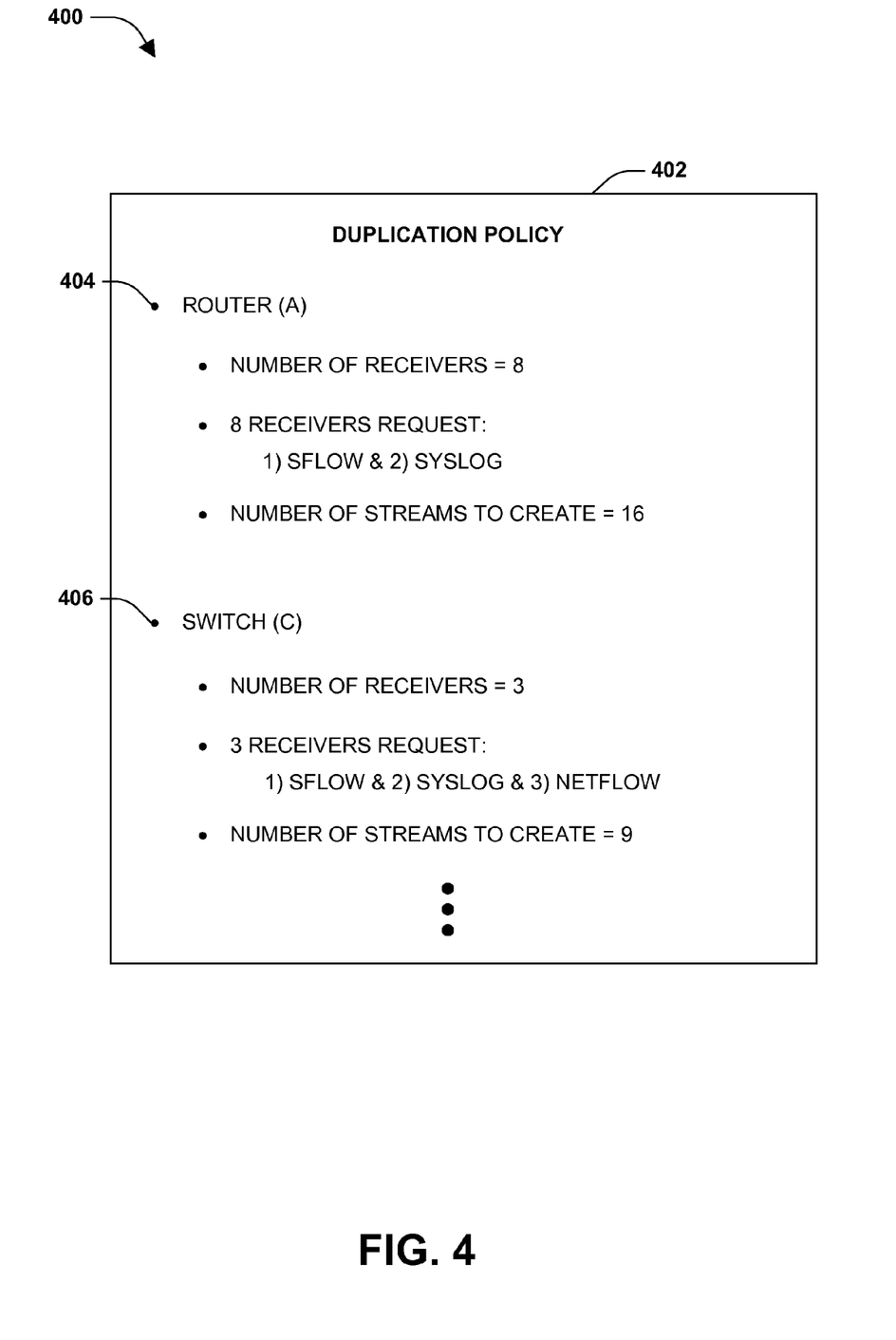
FIG. 4 is an illustration of an example of a duplication policy.

In one example of routing telemetry data, a first receiver, a second receiver, and/or other receivers for the telemetry data may be identified based upon a duplication policy (e.g., duplication policy 402 of FIG. 4). The duplication policy may comprise a number of receivers that are to receive the telemetry data (e.g., 8 receivers), one or more telemetry stream types utilized by respective receivers (e.g., respective receivers request telemetry streams formatted according to an sflow format and a syslog format), and/or a number of telemetry streams to create (e.g., 16 total telemetry streams—8 sflow and 8 syslog). The telemetry data may be forked into a first telemetry data stream for the first receiver, a second telemetry data stream for the second receiver, and/or other telemetry data streams for other receivers. In one example, a field within the telemetry data (e.g., an arbitrary field, such as a vlan tag identifying a previous node that handled a data packet of the telemetry data) may be replaced with a first receiver ID associated with the first receiver (e.g., a first MAC address) and/or a second received ID associated with the second receiver (e.g., a second MAC address).

Figure 5:
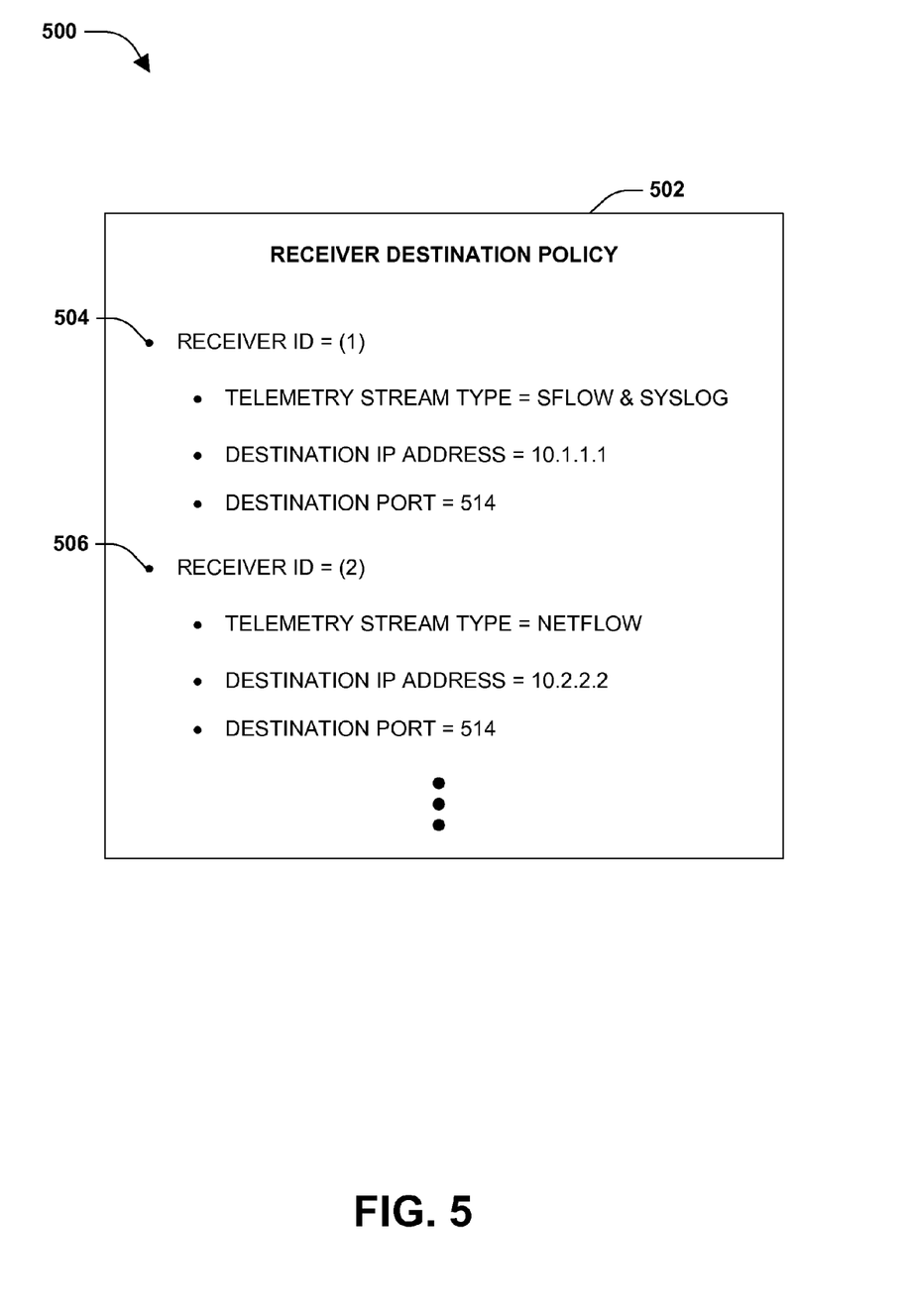
FIG. 5 is an illustration of an example of a receiver destination policy.

A receiver destination policy may be utilized to format the first telemetry data stream and/or the second telemetry data stream (e.g., destination receiver policy 502 of FIG. 5). For example, the receiver destination policy may comprise an entry mapping the first received ID to a telemetry stream type, a destination IP address, and/or a destination port. In this way, the first telemetry data stream may be formatted according to the entry for delivery to the first receiver. Similarly, the second telemetry data stream may be formatted according to a second entry, associated with the second receiver, for delivery to the second receiver. It may be appreciated that in one example, the first telemetry data stream and/or the second telemetry data stream may be formatted in-flight without being stored within a storage device, such as a disk drive of a server, which may mitigate security risks, processing overhead, and/or latency, for example.

The following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Telemetry data may comprise unidirectional data that is pushed from a source, such as a network device, to a receiver. For example, a network device may wrap telemetry data into one or more user datagram protocol (UDP) packets for delivery to the receiver. Because the network device may not comprise sophisticated CPU and/or memory functionality, pushing telemetry data to one or more receivers may burden the network device. Accordingly, as provided herein, telemetry data is routed to one or more receivers in-flight, which may mitigate resource strain on the network device.

Figure 1:
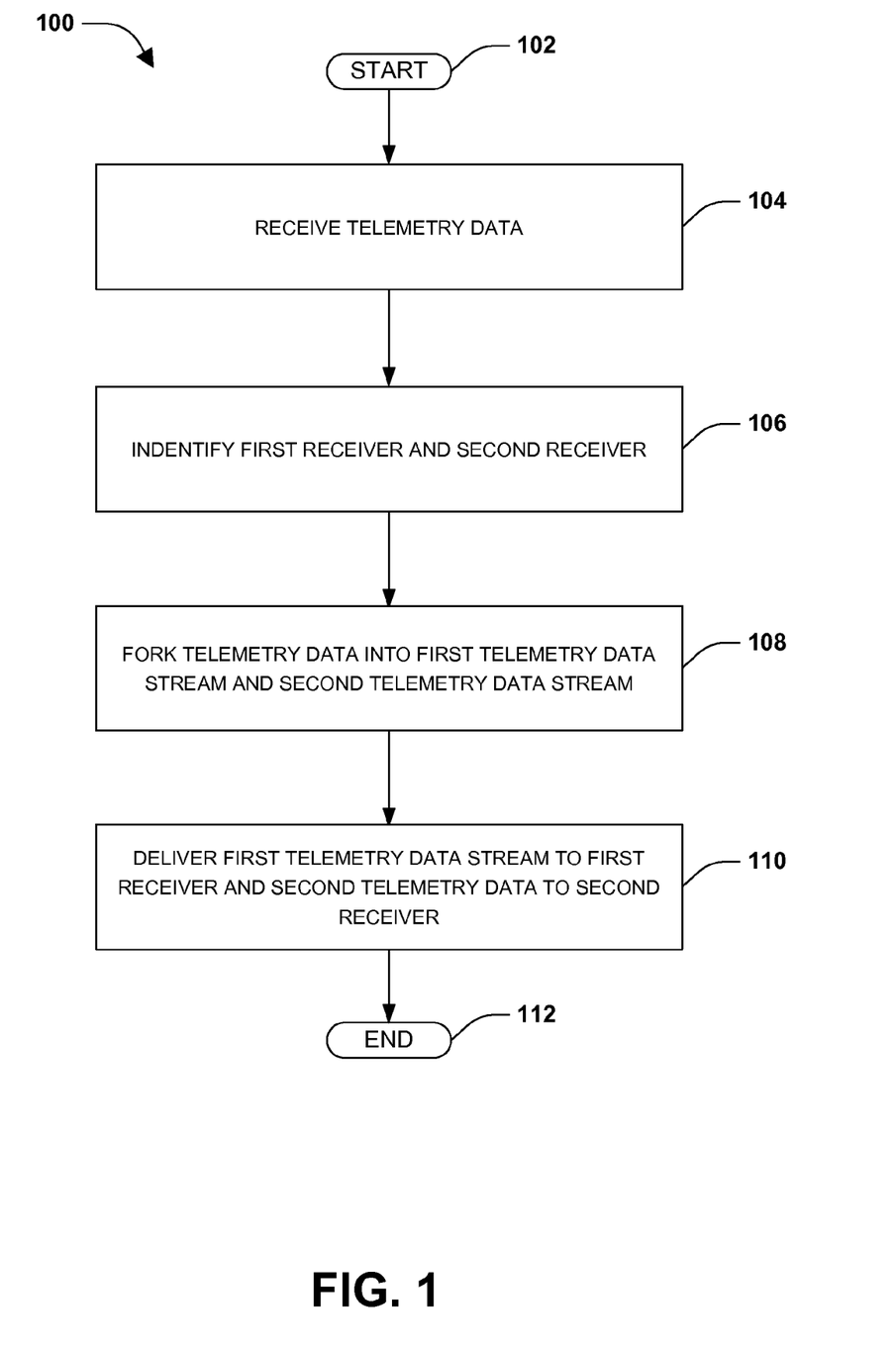
FIG. 1 is a flow diagram illustrating an exemplary method of routing telemetry data to one or more receivers.

One embodiment of routing telemetry data to one or more receivers is illustrated by an exemplary method 100 in FIG. 1. At 102, the method starts. At 104, telemetry data is received from a network device. In one example, the telemetry data is received by a duplication component that may be implemented at least in part via an application specific integrated circuit (ASIC) of a router or switch. The telemetry data may comprise connection less data (e.g., as opposed to state-based data, such as HTML data), unidirectional data, data wrapped within a user datagram protocol (UDP) package, and/or other types of data transmitted from a source to a receiver.

At 106, a first receiver, a second receiver, and/or other receivers that are to receive the telemetry data may be identified based upon a duplication policy (e.g., duplication policy 402 of FIG. 4). In one example, the duplication policy may comprise a number of receivers that are to receive the telemetry data (e.g., the first receiver, the second receiver, etc.), one or more telemetry stream types utilized by respective receivers (e.g., the first receiver may request telemetry data streams formatted according to an sflow format, a syslog format, and a cflow format; the second receiver may request a telemetry data stream formatted according to an sflow format; etc.), and/or a number of telemetry streams to create (e.g., 4 total telemetry streams—2 sflow, 1 syslog, and 1 cflow). A field, such as an arbitrary field, within the telemetry data may be replaced with a first receiver ID associated with the first receiver (e.g., a MAC address of the first receiver) and/or a second receiver ID associated with the second receiver (e.g., a MAC address of the second receiver), which may be used to fork (e.g., duplicate) the telemetry data for delivery to the first receiver and/or the second receiver, etc. In one example, the duplication policy may be specified by a computing device that is external to the duplication component. For example, an administrative server may utilize an open flow technology to provide the duplication policy to a switch or router within which the duplication component is implemented.

At 108, the telemetry data may be forked into a first telemetry data stream for the first receiver, a second telemetry data stream for the second receiver, and/or other telemetry data streams for other receivers. The first telemetry data stream and/or the second telemetry data stream may be formatted for delivery to the appropriate receiver according to a receiver destination policy (e.g., receiver destination policy 502 of FIG. 5). In one example, the receiver destination policy may comprise one or more entries used to format a telemetry data stream for delivery to a receiver. An entry may map a receiver ID of a receiver to a telemetry stream type (e.g., cflow, sflow, syslog, etc.), a destination IP address of the receiver, and/or a destination port of the receiver. It may be appreciated that the entry may map the receiver ID to other parameters, such as a duplication parameter specifying whether the receiver requests further duplication of the telemetry data, a delivery parameter specifying whether the telemetry data stream is to be delivered to multiple destinations, etc. In one example of formatting the first telemetry data stream, the first telemetry data stream may be formatted according to a first telemetry stream type, a first destination IP address, and/or a first destination port that are mapped to the first receiver ID within the receiver destination policy.

Because a receiver may be configured to verify that a telemetry data stream originated from the network device as the source of the telemetry data, one or more original properties of the telemetry data, such as identification information of the network device, may be retained within the telemetry data stream. In this way, the first receiver may verify that the first telemetry data stream originated from the network device based upon one or more original properties identifying the network device, regardless of whether the telemetry data was formatted as and/or delivered through the first telemetry data stream.

Because storing the telemetry data within a storage device before delivery to the one or more receivers may result in security risks, processing overhead, and/or latency in delivering a telemetry data stream, the telemetry data stream may be created on the fly or in-flight (e.g., during processing of the telemetry data within a router and/or switch) without storing the telemetry data within a storage device, such as a disk drive of a server.

At 110, the first telemetry data stream is delivered to the first receiver and the second telemetry data stream is delivered to the second receiver, etc. based upon the receiver destination policy. For example, additional duplication, delivery to one or more IP address, and/or delivery to one or more ports specified within the receiver destination policy may be performed to deliver a telemetry data stream to a receiver. At 112, the method ends.

Figure 2:
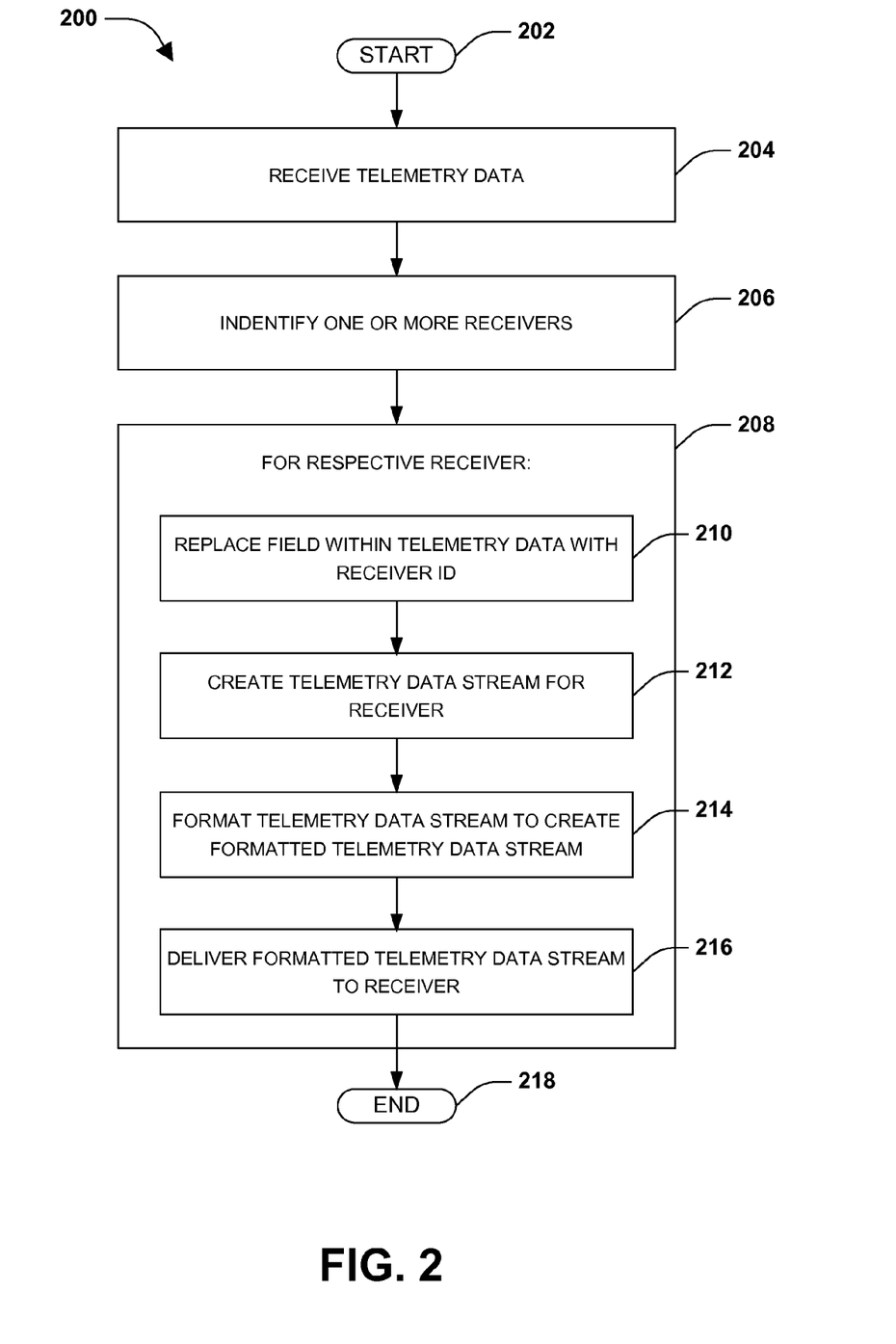
FIG. 2 is a flow diagram illustrating an exemplary method of routing telemetry data to one or more receivers.

One embodiment of routing telemetry data to one or more receivers is illustrated by an exemplary method 200 in FIG. 2. At 202, the method starts. At 204, telemetry data is received from a network device. At 206, one or more receivers for the telemetry data are identified based upon a duplication policy. At 208, for respective receivers, a field within the telemetry data is replaced with a receiver ID associated with a receiver to create modified telemetry data, at 210. At 212, a telemetry data stream for the receiver is created based upon the modified telemetry data. At 214, the telemetry data stream may be formatted according to a telemetry stream type, a destination IP address, and/or a destination port mapped to the receiver ID to create a formatted telemetry data stream. At 216, the formatted telemetry data stream is delivered to the receiver. In one example, the creating the telemetry data stream, the formatting the telemetry data stream, and/or the delivering of the formatted data stream are performed on the fly or in-flight (e.g., while the telemetry data and/or the telemetry data stream are being processed within a network device, such as by an application specified integrated circuit (ASIC) of a router and/or a switch, for example) without storing the telemetry data within a storage device, such as a disk drive of a server. In this way, telemetry data may be routed to one or more receivers in-flight. At 218, the method ends.

Figure 3:
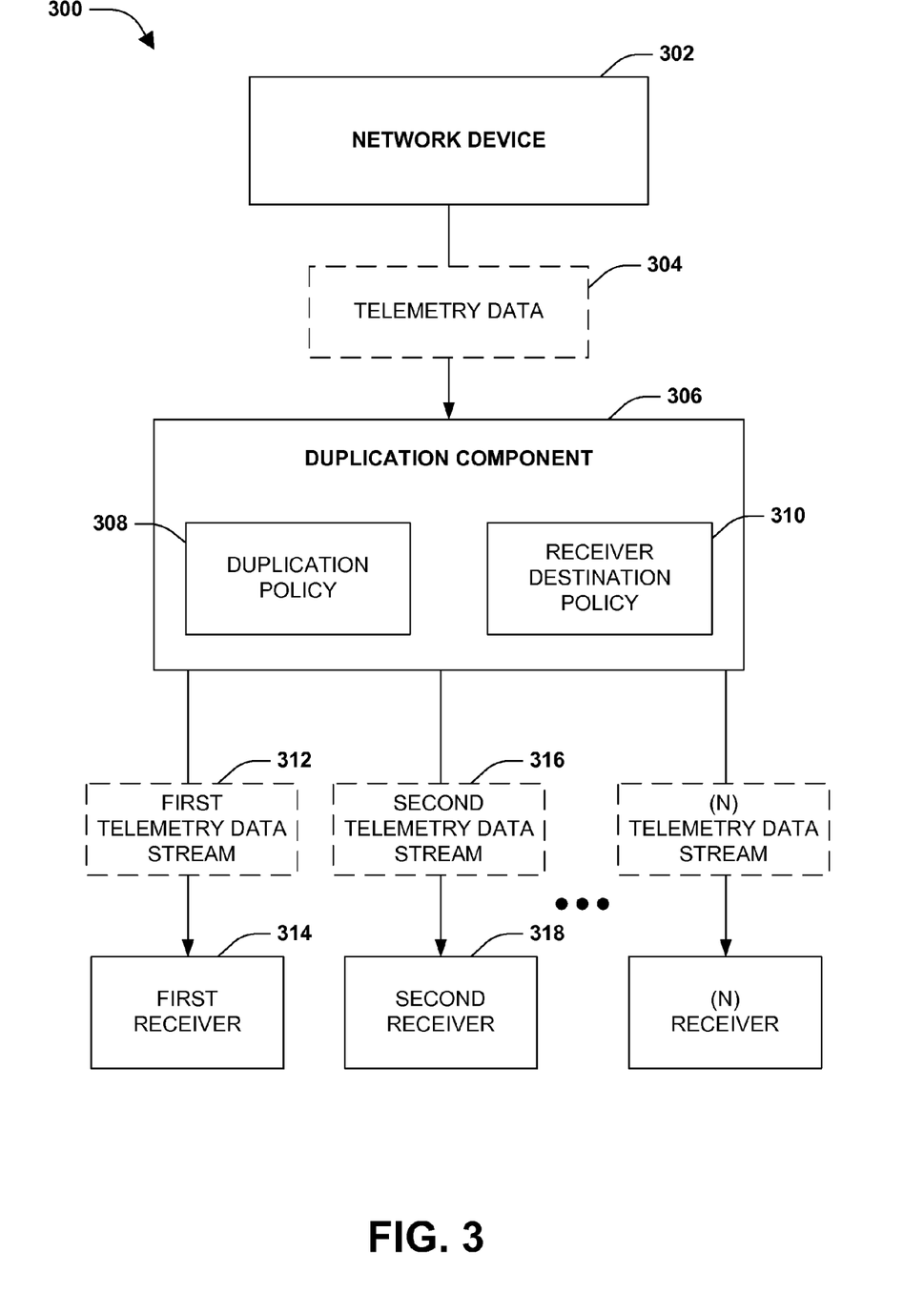
FIG. 3 is a component block diagram illustrating an exemplary system for routing telemetry data to one or more receivers.

FIG. 3 illustrates an example of a system 300 configured for routing telemetry data to one or more receivers. The system 300 may comprise a duplication component 306. In one example, the duplication component 306 may be implemented at least in part via an application specific integrated circuit (ASIC) of a router, switch, or other network device (e.g., a network device 302 or a different network device not illustrated). The duplication component 306 may utilize a duplication policy 308 and/or a receiver destination policy 310 in order to route telemetry data 304 from the network device 302 to one or more receivers. In one example, the duplication policy 308 and/or the receiver destination policy 310 may be specified by a computing device external to a network device implementing the duplication component 306 (e.g., an administrative server using an openflow technique to specify the duplication policy 308 and/or the receiver destination policy 310 for use by the duplication component 306).

In one example of routing telemetry data 304 (e.g., connectionless data, unidirectional data, data wrapped within a user datagram protocol (UDP) package, etc.), the duplication component 306 may be configured to receive the telemetry data 304 from the network device 302. The duplication component 306 may identify a first receiver 314, a second receiver 318, and/or other receivers for the telemetry data 304 based upon the duplication policy 308. In one example, the duplication policy 308 may comprise a number of receivers that are to receive the telemetry data 304, one or more telemetry stream types utilized by respective receivers, and/or a number of telemetry streams to create. For example, the duplication policy 308 may specify that the first receiver 314 requests the telemetry data 304 according to a cflow format, the second receiver 318 requests the telemetry data 303 according to an sflow format, and a third receiver requests the telemetry data 304 according to a cflow format and a syslog format. In this way, the duplication component 306 may replace a field within the telemetry data 304 with one or more receiver IDs (e.g., a MAC address) corresponding to the first receiver 314, the second receiver 318, and/or other receivers identified from the duplication policy 308.

The duplication component 306 may be configured to fork the telemetry data into a first telemetry data stream 312 for the first receiver 314 (e.g., a cflow data stream), a second telemetry data stream 316 for the second receiver 318 (e.g., an sflow data stream), and/or other telemetry data streams (e.g., a cflow data stream and a syslog data stream for the third receiver). The duplication component 306 may format respective telemetry data streams based upon one or more entries within the receiver destination policy 310. For example, the receiver destination policy 310 comprises an entry mapping a first receiver ID for the first receiver 314 to a first telemetry data stream type (e.g., cflow), a first destination IP address, and/or a first destination port. Accordingly, the duplication component 306 may format the first telemetry data stream 312 as a cflow data stream type, and may route the first telemetry data stream 312 to the first destination IP address at the first destination port. One or more original properties of the telemetry data 304 (e.g., identifying the network device 302) may be retained within the first telemetry data stream 312 because the first receiver 314 may verify that the first telemetry data stream 312 originated from the network device 302. The duplication component 306 may create and/or format respective telemetry data streams in-flight (e.g., within a network device, such as the network device 302 or another network device not illustrated) without storing the telemetry data 304 within a storage device, such as a disk drive of a server. In this way, the duplication component 306 may be configured to deliver the first telemetry data stream 312 to the first receiver 314, the second telemetry data stream 316 to the second receiver 318, and/or other telemetry data streams to other receivers (e.g., a cflow data stream and a syslog data stream to the third receiver).

FIG. 4 illustrates an example 400 of a duplication policy 402. The duplication policy 402 may be utilized to route telemetry data from a network device to one or more receivers. The duplication policy 402 may comprise a first entry 404, a second entry 406, and/or other entries not illustrated. The first entry 404 may be used to identify one or more receivers that have requested telemetry data from a router (A). For example, the first entry 404 may specify that 8 receivers have requested telemetry data from router (A). The first entry 404 may be used to identify one or more telemetry data streams that are to be created from the telemetry data of router (A). For example, 16 telemetry data streams are to be created based upon 8 receivers requesting telemetry data according to an sflow format and a syslog format (e.g., 8 sflow telemetry data streams and 8 syslog telemetry data streams).

The second entry 406 may be used to identify one or more receivers that have requested telemetry data from a switch (C). For example, the second entry 406 may specify that 3 receivers have requested telemetry data from switch (C). The second entry 406 may be used to identify one or more telemetry data streams that are to be created from the telemetry data from switch (C). For example, 9 telemetry data streams are to be created based upon 3 receivers requesting telemetry data according to an sflow format, a syslog format, and a netflow format (e.g., 3 sflow telemetry data streams, 3 syslog telemetry data streams, and 3 netflow telemetry data streams). It may be appreciated that in one example, different receivers may specify different formats of telemetry data (e.g., a first receiver may request telemetry data from a router (X) in an sflow format, while a second receiver may request telemetry data from router (X) in an sflow and netflow format, resulting in the creation of 2 sflow telemetry data streams and 1 netflow telemetry data stream).

FIG. 5 illustrates an example 500 of a receiver destination policy 502. The receiver destination policy 502 may be utilized in forking, formatting, and/or delivering telemetry data streams to one or more receivers. The receiver destination policy 502 may comprise a first entry 504 specifying how to route telemetry data to a first receiver, a second entry 506 specifying how to route telemetry data to a second receiver, and/or other entries not illustrated. The first entry 504 may map a receiver ID (1), identifying the first receiver, to a telemetry stream type (e.g., an sflow format and a syslog format requested by the first receiver), a destination IP address (e.g., telemetry data is to be routed to 10.1.1.1), and a destination port (e.g., telemetry data is to be delivered to port 514). In this way, one or more telemetry data streams (e.g., an sflow telemetry data stream, a syslog telemetry data stream, etc.) may be created, formatted, and/or delivered to the first receiver based upon the first entry 504.

The second entry 506 may map a receiver ID (2), identifying the second receiver, to a telemetry stream type (e.g., a netflow format requested by the second receiver), a destination IP address (e.g., telemetry data is to be routed to 10.2.2.2), and a destination port (e.g., telemetry data is to be delivered to port 514). In this way, one or more telemetry data streams (e.g., a netflow telemetry data stream) may be created, formatted, and/or delivered to the second receiver based upon the second entry 506.

Figure 6:
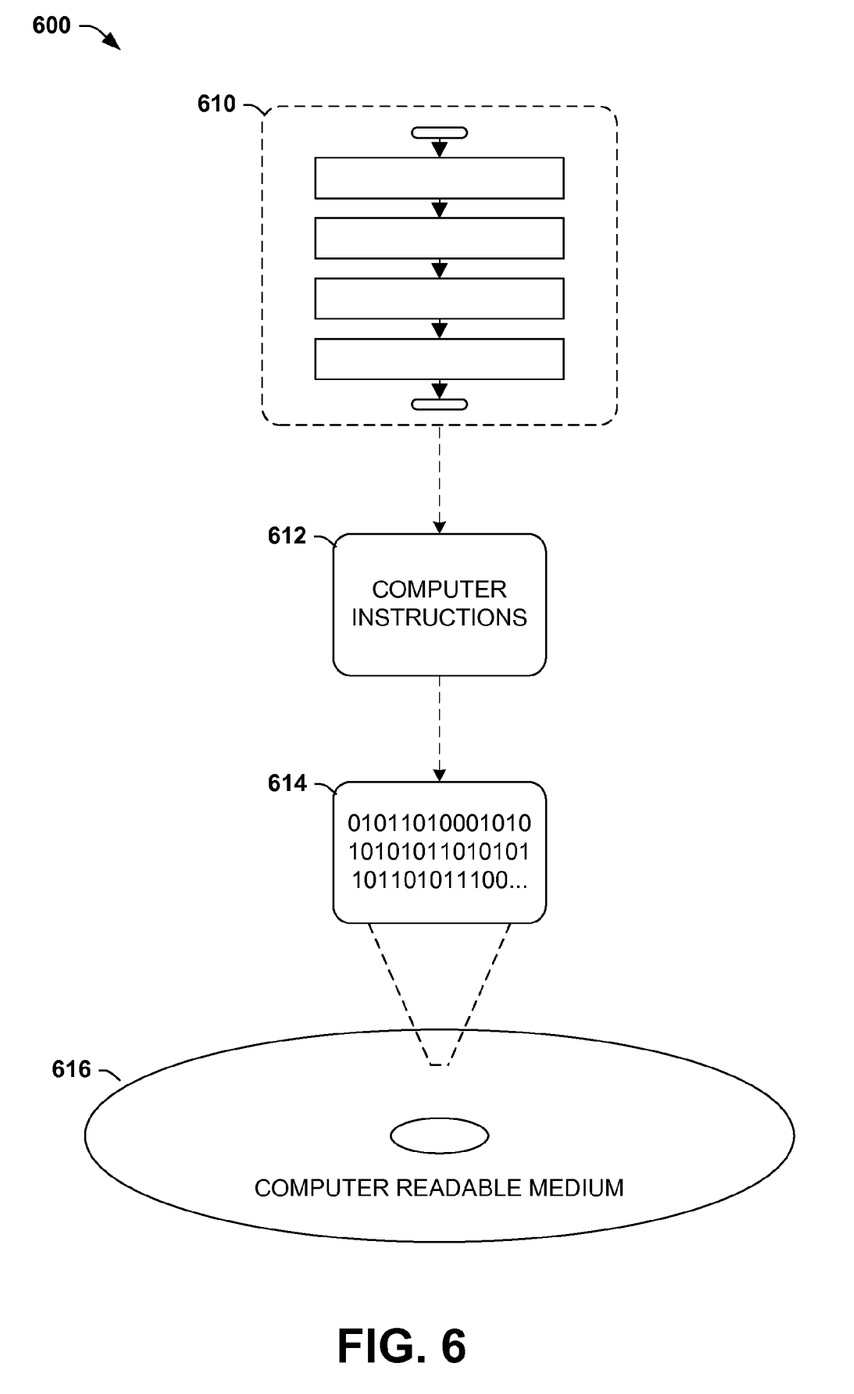
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or at least some of exemplary method 200 of FIG. 2, for example. In another such embodiment, the processor-executable instructions 612 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
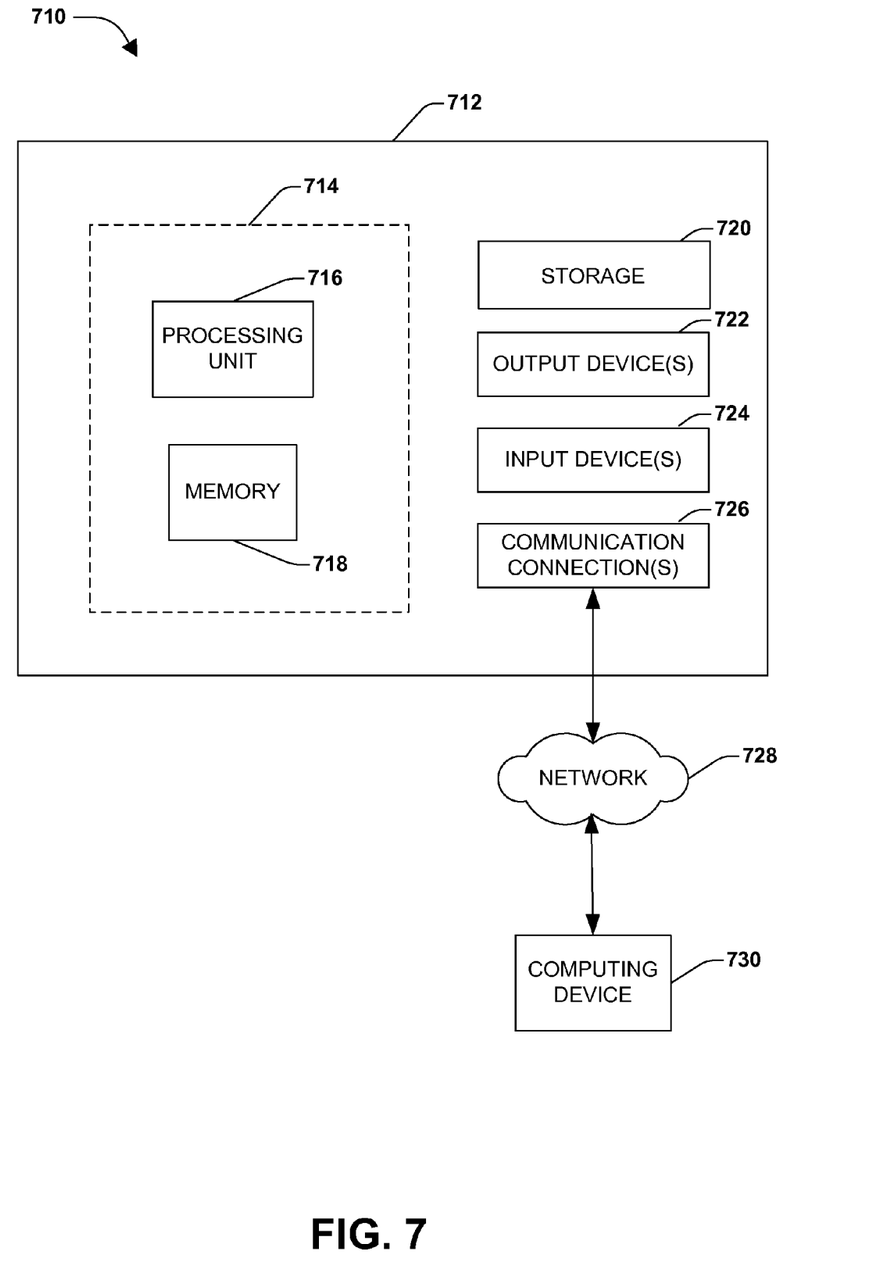
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for routing telemetry data to one or more receivers, comprising:
   receiving telemetry data from a network device;
   identifying a first receiver and a second receiver that are to receive the telemetry data based upon a duplication policy;
   forking the telemetry data into a first telemetry data stream for the first receiver and a second telemetry data stream for the second receiver, the forking comprising:
      creating the first telemetry data stream in-flight without storing the telemetry data within a storage device; and
   delivering the first telemetry data stream to the first receiver and the second telemetry data stream to the second receiver based upon a receiver destination policy.

2. The method of claim 1, the duplication policy comprising at least one of:
   a number of receivers that are to receive the telemetry data;
   one or more telemetry stream types utilized by respective receivers; or
   a number of telemetry streams to create.

3. The method of claim 1, the identifying comprising:
   replacing a field within the telemetry data with one or more receiver IDs, a receiver ID comprising a MAC address associated with a receiver.

4. The method of claim 1, the receiver destination policy comprising one or more entries used to format a telemetry data stream for delivery to a receiver, an entry mapping a receiver ID to a telemetry stream type, a destination IP address, and a destination port.

5. The method of claim 3, at least one of:
   the field comprising a first receiver ID for the first receiver, and the delivering comprising:
      formatting the first telemetry data stream according to a first telemetry stream type, a first destination IP address, and a first destination port that are mapped to the first receiver ID within the receiver destination policy; or
   the field comprising a second receiver ID for the second receiver, and the delivering comprising:
      formatting the second telemetry data stream according to a second telemetry stream type, a second destination IP address, and a second destination port that are mapped to the second receiver ID within the receiver destination policy.

6. The method of claim 1, comprising at least one of:
   retaining within the first telemetry data stream one or more original properties of the telemetry data for verification, by the first receiver, that the first telemetry data stream originated from the network device; or
   retaining within the second telemetry data stream the one or more original properties of the telemetry data for verification, by the second receiver, that the second telemetry data stream originated from the network device.

7. The method of claim 1, the forking comprising at least one of:
   forking the telemetry data into a third telemetry data stream for the first receiver, the first telemetry data stream having a first format and the third telemetry data stream having a second format different than the first format; or
   forking the telemetry data into a fourth telemetry data stream for the second receiver, the second telemetry data stream having a third format and the fourth telemetry data stream having a fourth format different than the third format.

8. The method of claim 1, the telemetry data comprising at least one of:
   connectionless data;
   unidirectional data; or
   data wrapped within a user datagram protocol (UDP) package.

9. The method of claim 1, the forking performed by an application specific integrated circuit of at least one of a router or a switch.

10. A system for routing telemetry data to one or more receivers, comprising:
a duplication component configured to:
receive telemetry data from a network device;
identify a first receiver and a second receiver that are to receive the telemetry data based upon a duplication policy;
fork the telemetry data into a first telemetry data stream for the first receiver and a second telemetry data stream for the second receiver; and
deliver the first telemetry data stream to the first receiver and the second telemetry data stream to the second receiver based upon a receiver destination policy,
the receiver destination policy comprising one or more entries used to format a telemetry data stream for delivery to a receiver, an entry mapping a receiver ID to a telemetry stream type, a destination IP address, and a destination port.

11. The system of claim 10, the duplication policy comprising at least one of:
a number of receivers that are to receive the telemetry data;
one or more telemetry stream types utilized by respective receivers; or
a number of telemetry streams to create.

12. The system of claim 10, the duplication component configured to:
replace a field within the telemetry data with one or more receiver IDs.

13. The system of claim 10, the duplication component configured to at least one of:
fork the telemetry data into a third telemetry data stream for the first receiver, the first telemetry data stream having a first format and the third telemetry data stream having a second format different than the first format; or
fork the telemetry data into a fourth telemetry data stream for the second receiver, the second telemetry data stream having a third format and the fourth telemetry data stream having a second format different than the first format.

14. The system of claim 10, the duplication policy comprising a number of receivers that are to receive the telemetry data.

15. The system of claim 10, the duplication component configured to at least one of:
retain within the first telemetry data stream one or more original properties of the telemetry data for verification, by the first receiver, that the first telemetry data stream originated from the network device; or
retain within the second telemetry data stream the one or more original properties of the telemetry data for verification, by the second receiver, that the second telemetry data stream originated from the network device.

16. The system of claim 10, the duplication component configured to at least one of:
create the first telemetry data stream in-flight without storing the telemetry data within a storage device; or
create the second telemetry data stream in-flight without storing the telemetry data within the storage device.

17. The system of claim 10, the telemetry data comprising at least one of:
connectionless data;
unidirectional data; or
data wrapped within a user datagram protocol (UDP) package.

18. The system of claim 10, the duplication component implemented at least in part via an application specific integrated circuit of at least one of a router or a switch.

19. A computer-readable storage device comprising processor-executable instructions that when executed perform a method for routing telemetry data to one or more receivers, comprising:
receiving telemetry data from a network device;
identifying a first receiver and a second receiver that are to receive the telemetry data based upon a duplication policy, the identifying comprising:
replacing a field within the telemetry data with one or more receiver IDs, a receiver ID comprising a MAC address associated with a receiver;
forking the telemetry data into a first telemetry data stream for the first receiver and a second telemetry data stream for the second receiver; and
delivering the first telemetry data stream to the first receiver and the second telemetry data stream to the second receiver based upon a receiver destination policy.

20. The computer-readable storage device of claim 19, the field comprising a first receiver ID for the first receiver, and the delivering comprising:
formatting the first telemetry data stream according to a first telemetry stream type, a first destination IP address, and a first destination port that are mapped to the first receiver ID within the receiver destination policy.

* * * * *